United States Patent
Kim

(10) Patent No.: US 10,004,045 B2
(45) Date of Patent: Jun. 19, 2018

(54) TRANSMISSION POWER MANAGING METHOD OF HETEROGENEOUS NETWORK SYSTEM

(71) Applicant: Electronics and Telecommmunications Research Institute, Daejeon (KR)

(72) Inventor: Hyung Sub Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 164 days.

(21) Appl. No.: 15/008,196

(22) Filed: Jan. 27, 2016

(65) Prior Publication Data

US 2016/0219530 A1     Jul. 28, 2016

(30) Foreign Application Priority Data

Jan. 27, 2015    (KR) .......................... 10-2015-0012954

(51) Int. Cl.
*H04W 4/00*   (2018.01)
*H04W 52/24*  (2009.01)
*H04W 52/38*  (2009.01)

(52) U.S. Cl.
CPC ....... *H04W 52/244* (2013.01); *H04W 52/383* (2013.01); *H04W 76/14* (2018.02)

(58) Field of Classification Search
CPC ............. H04W 52/244; H04W 52/383; H04W 76/023; H04W 76/14
USPC ......................................................... 370/329
See application file for complete search history.

(56) References Cited

U.S. PATENT DOCUMENTS

| | | | |
|---|---|---|---|
| 2009/0325625 A1* | 12/2009 | Hugl .................... | H04W 52/16 455/522 |
| 2012/0165028 A1 | 6/2012 | Kim et al. | |
| 2013/0157676 A1 | 6/2013 | Baek et al. | |
| 2014/0036792 A1* | 2/2014 | Li ........................ | H04W 24/04 370/329 |
| 2015/0003440 A1 | 1/2015 | Lim et al. | |

FOREIGN PATENT DOCUMENTS

| | | |
|---|---|---|
| KR | 10-2014-0101316 A | 8/2014 |
| KR | 10-2014-0103867 A | 8/2014 |
| KR | 10-2014-0106592 A | 9/2014 |

* cited by examiner

*Primary Examiner* — Sai Ming Chan
(74) *Attorney, Agent, or Firm* — NSIP Law

(57) ABSTRACT

Disclosed is a transmission power managing method of a heterogeneous network system, including: determining, when a first terminal communicates with a second terminal by using a first D2D transmission power value through a first communication network, whether a first cellular transmission power value of a third terminal satisfying a quality condition of the third terminal which communicates with a base station through a second communication network exists; determining, when the first cellular transmission power value exists and the third terminal communicates with the base station by using the first cellular transmission power value, whether a second D2D transmission power value of the first terminal satisfying a quality condition of the second terminal exists; and updating, by the first terminal, the first D2D transmission power value to the second D2D transmission power value when the second D2D transmission power value exists.

9 Claims, 4 Drawing Sheets

TRANSMISSION POWER MANAGING METHOD OF HETEROGENEOUS NETWORK SYSTEM

CROSS-REFERENCE TO RELATED APPLICATIONS

This application claims priority to and the benefit of Korean Patent Application No. 10-2015-0012954 filed in the Korean Intellectual Property Office on Jan. 27, 2015, the entire contents of which are incorporated herein by reference.

TECHNICAL FIELD

The present invention relates to a transmission power managing method of a heterogeneous network system.

BACKGROUND ART

With the rise in propagation of various mobile communication terminals including smart phones, data usage has rapidly increased. As a result, traffic has explosively increased and dissatisfaction by users with service quality which is not continuous has increased. A device-to-device (D2D) communication technology proposed as a technology proposed as an alternative thereto has attracted public attention to enhance the service quality of the user while reducing a burden of a communication network.

In the D2D communication technology, communication is directly performed among devices without requiring an infrastructure and WiFi Direct that extends based on IEEE 802.11n, and the like are examples. In 3GPP and the like, a research into the D2D communication based a cellular (LTE) system has been currently actively performed and since the D2D communication technology based on the cellular system similarly uses a frequency band used in a conventional cellular communication network, the D2D communication technology brings about interference among D2D communication links and interference with the conventional cellular communication network to thereby exert a negative influence on the overall system performance.

SUMMARY OF THE INVENTION

The present invention has been made in an effort to provide a transmission power managing method of a heterogeneous network system, which can control interference among communication networks in the heterogeneous network system.

The technical objects of the present invention are not limited to the aforementioned technical objects, and other technical objects, which are not mentioned above, will be apparently appreciated to a person having ordinary skill in the art from the following description.

An exemplary embodiment of the present invention provides a transmissions power managing method of a heterogeneous network system, including: determining, when a first terminal communicates with a second terminal by using a first D2D transmission power value through a first communication network, whether a first cellular transmission power value of a third terminal satisfying a quality condition of the third terminal which communicates with a base station through a second communication network exists; determining, when the first cellular transmission power value exists and the third terminal communicates with the base station by using the first cellular transmission power value, whether a second D2D transmission power value of the first terminal satisfying a quality condition of the second terminal exists; and updating, by the first terminal, the first D2D transmission power value to the second D2D transmission power value when the second D2D transmission power value exists.

According to an exemplary embodiment of the present invention, a transmission power managing method of a heterogeneous network system can control interference among communication networks.

According to the exemplary embodiment of the present invention, the transmission power managing method of the heterogeneous network system can manage a service quality of a communication network for device-to-device communication and a cellular communication network.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

Figure 1:
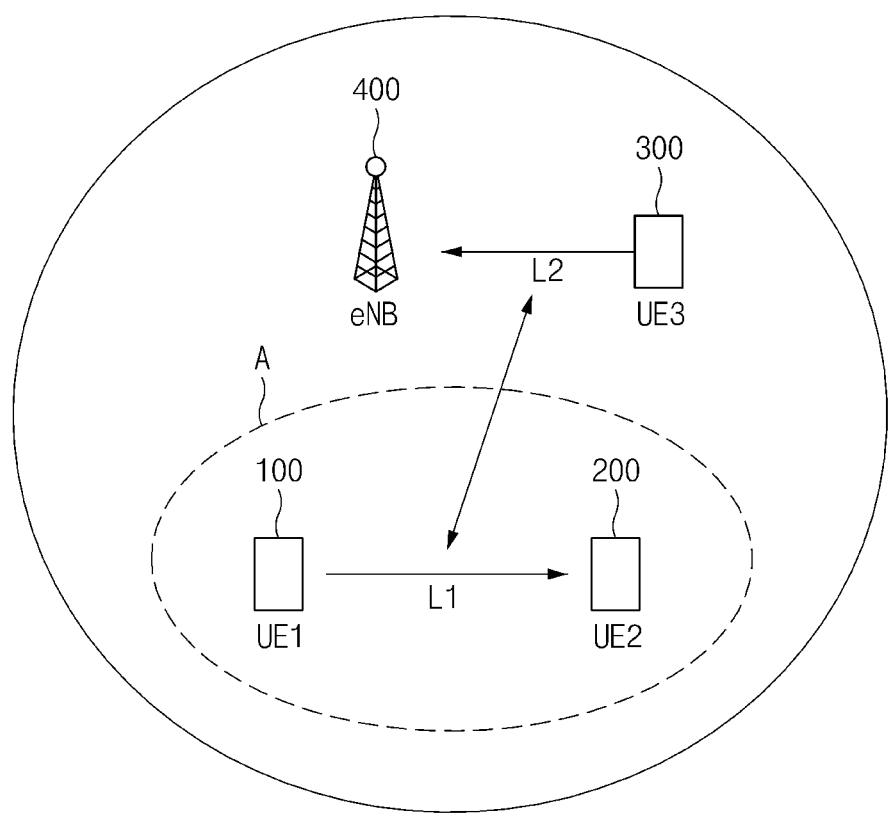
FIG. 1 schematically illustrates a heterogeneous network system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, some exemplary embodiments of the present invention will be described in detail with reference to the exemplary drawings. When reference numerals refer to components of each drawing, it is noted that although the same components are illustrated in different drawings, the same components are designated by the same reference numerals as possible. In describing the exemplary embodiments of the present invention, when it is determined that the detailed description of the known components and functions related to the present invention may obscure understanding of the exemplary embodiments of the present invention, the detailed description thereof will be omitted.

Terms such as first, second, A, B, (a), (b), and the like may be used in describing the components of the exemplary embodiments of the present invention. The terms are only used to distinguish a constituent element from another constituent element, but nature or an order of the constituent element is not limited by the terms. Further, if it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as ideal or excessively formal meanings unless clearly defined in the present application.

Hereinafter, a 'terminal' may be referred to as a mobile station (MSuser equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or other terms.

Various exemplary embodiments of the terminal may include a cellular phone, a smart phone having a wireless communication function, a personal digital assistant (PDA) having the wireless communication function, a wireless modem, a portable computer having the wireless communication function, a photographing device such as a digital camera having the wireless communication function, a gaming device having the wireless communication function, music storing and playing home appliances having the wireless communication function, Internet home appliances in which wireless Internet access and browsing are available and portable units or terminals having integrated combinations of the functions, but are not limited thereto.

Hereinafter, a 'base station' may be a term which generally represents a fixed or movable point which communicates with the terminal and may be terms generally designated as a base station, a node-B, an eNode-B, a base transceiver system (BTS), an access point, a relay, a cell, and the like.

FIG. 1 schematically illustrates a heterogeneous network system according to an exemplary embodiment of the present invention.

Referring to FIG. 1, the heterogeneous network system according to the exemplary embodiment of the present invention may include a first terminal (UE1) 100, a second terminal (UE2) 200, a third terminal (UE3) 300, and a base station (eNB) 400.

The UE1 100 may communicate with the UE2 200 through a first communication network. For example, the first communication network may mean a communication network for device-to-device (D2D) communication. The UE1 100 may transmit data (for example, advertisement information) to the UE2 200 unidirectionally (L1) and transmit data to the UE2 200 repeatedly for a predetermined time. The UE1 100 may be a store terminal and when the UE2 200 is positioned in predetermined area A based on a store, the UE1 100 may transmit data to the UE2 200. For example, the UE2 200 may be a terminal predefined to receive the data from the UE1 100.

The UE3 300 may communicate with the eNB 400 through a second communication network. For example, the second communication network may mean a cellular communication network (e.g., 3G, LTE, LTE-A, etc.). For example, the UE3 300 may receive the data from the eNB 400 and transmit an ACK/NACK message for the received data to the eNB 400 through an uplink.

Meanwhile, the first communication network may share the uplink of the second communication network. That is, the UE1 100 may transmit the data to the UE2 200 through the uplink of the second communication network and interference may occur between the first communication network and the second communication network in the heterogeneous network system in which different communication networks coexist.

Hereinafter, a transmission power managing method capable of controlling the interference between the communication networks in the heterogeneous network system, which is described with reference to FIG. 1 will be described.

Figure 2:
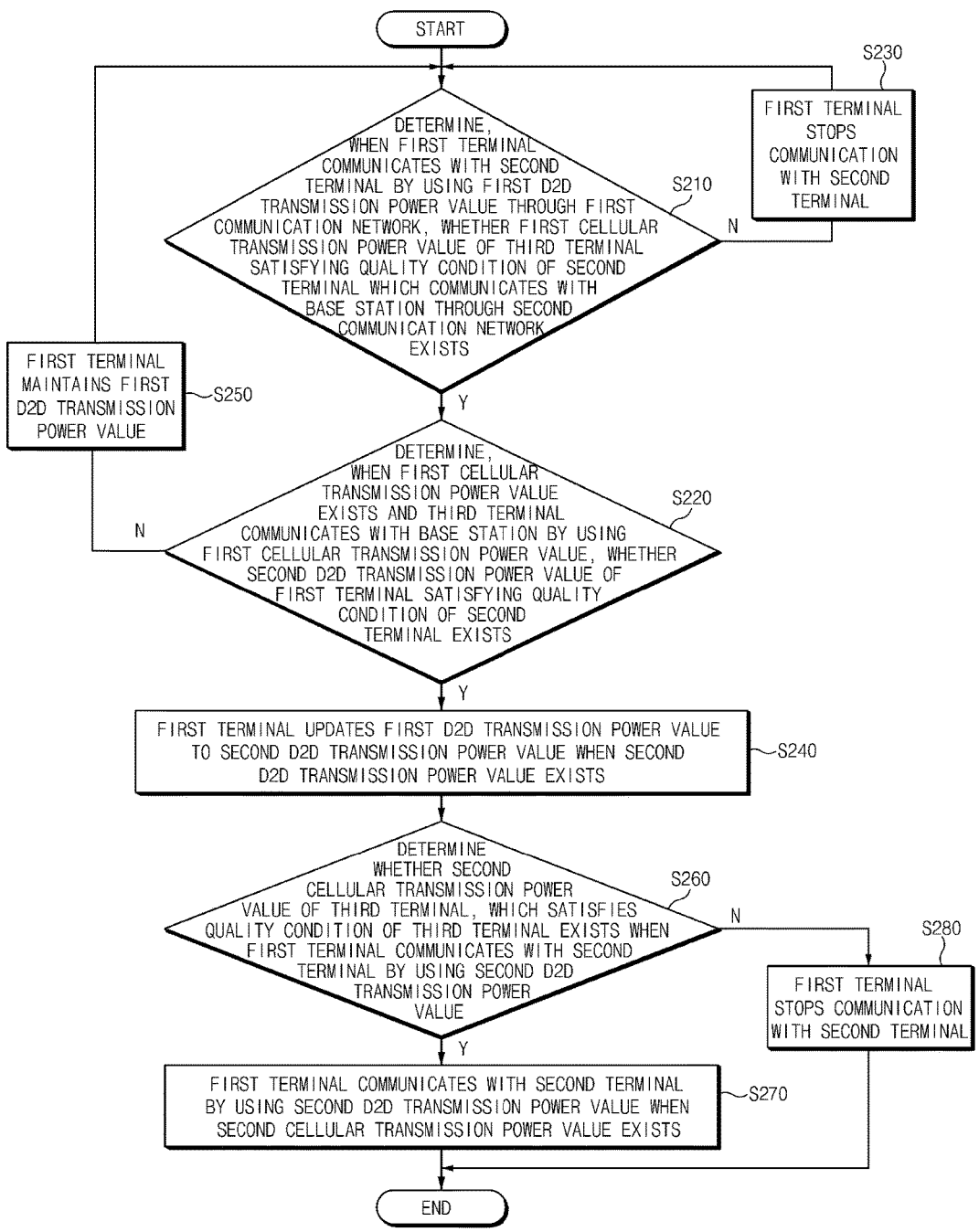
FIG. 2 is a flowchart illustrating a transmission power managing method of a heterogeneous network system according to an exemplary embodiment of the present invention.
Figure 3:
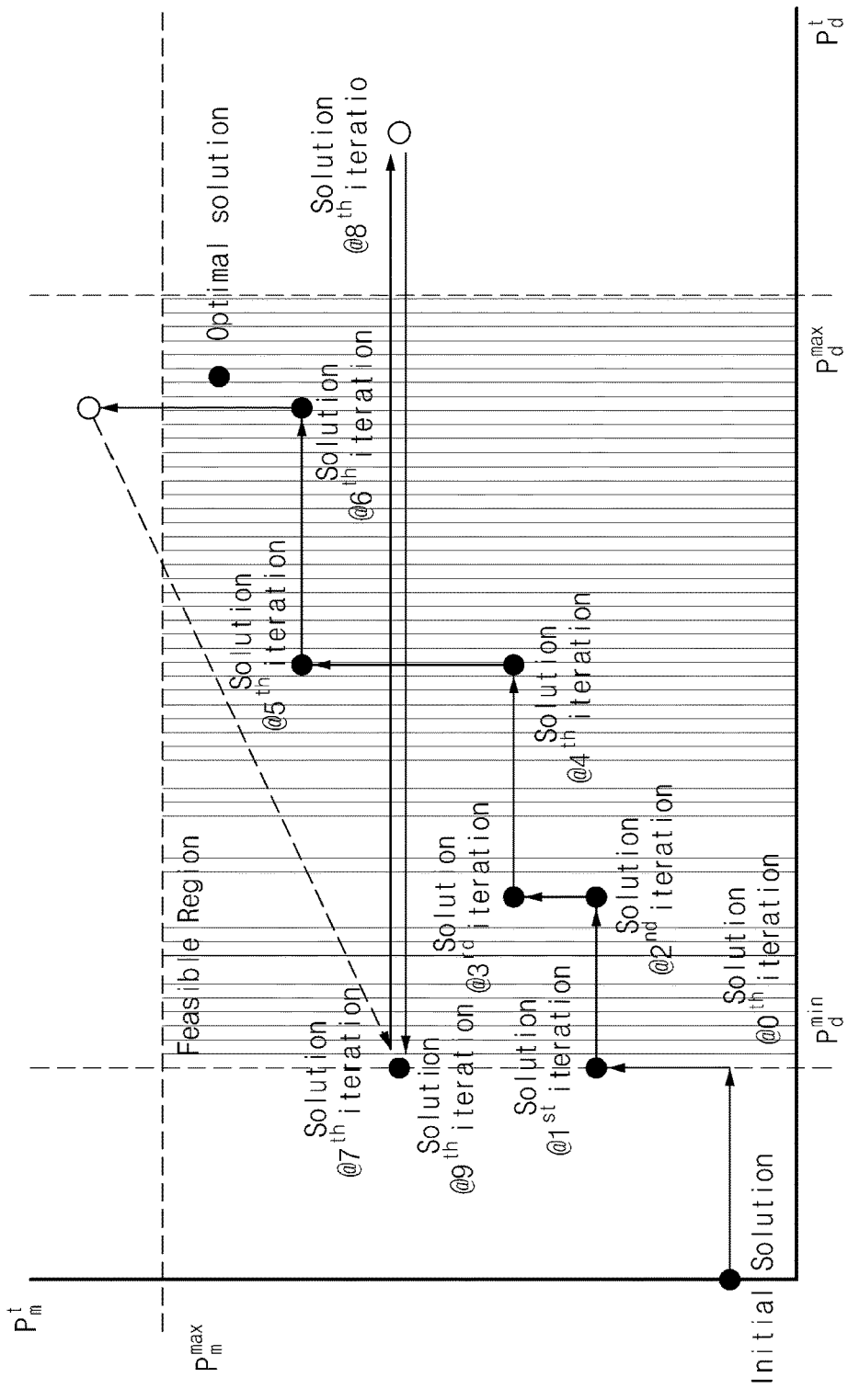
FIG. 3 is a graph, in detail, showing the transmission power managing method of the heterogeneous network system according to an exemplary embodiment of the present invention.

FIG. 2 is a flowchart illustrating a transmission power managing method of a heterogeneous network system according to an exemplary embodiment of the present invention. FIG. 3 is a graph, in detail, showing the transmission power managing method of the heterogeneous network system according to an exemplary embodiment of the present invention.

First, referring to FIG. 2, the transmission power managing method of the heterogeneous network system according to the exemplary embodiment of the present invention may include determining whether a first cellular transmission power value of a UE3, which satisfies a quality condition of the UE3 which communicates with an eNB through a second communication network exists when a UE1 communicates with a UE2 by using a first D2D transmission power value through a first communication network (S110), determining whether a second D2D transmission power value of the UE1, which satisfies a quality condition of the UE2 exists when a first cellular transmission power value exists and the UE3 communicates with the eNB by using the first cellular transmission power value (S120), stopping communication between the UE1 and the UE2 when the first cellular transmission power value does not exist (S130), updating the first D2D transmission power value to a second D2D transmission power value by the UE1 when the second D2D transmission power value exists (S140), maintaining the first D2D transmission power value by the UE1 when the second D2D transmissions power value does not exist (S150), determining whether a second cellular transmission power value of the UE3, which satisfies a quality condition of the UE3, exists when the UE1 communicates with the UE2 by using the second D2D transmission power value (S160), communicating with the UE2 by using the second D2D transmission power value by the UE1 when a second cellular transmission power value exists (S170), and stopping communication of the UE1 with the UE2 when the second cellular transmission power value does not exist (S180).

Hereinafter, steps S110 to S180 described above will be described in detail with reference to FIGS. 1 to 3.

First, while the UE1 100 communicates with the UE2 200 by using the first D2D transmission power value through the first communication network, the UE3 300 may determine whether the first cellular transmission power value satisfying the quality condition of the UE3 300 exists (S110). For example, the first D2D transmission power value may mean a minimum power value required for the UE1 100 to transmit data to the UE2 200. For example, the quality condition of the UE3 300 may mean a condition of a minimum signal to interference plus noise ratio (SINR) or more for communication between the UE3 300 and the UE2 200 through a cellular communication network.

In one aspect, it may be appreciated that the UE3 300 determines whether the first cellular transmission power value satisfying the quality condition of the UE3 300 exists by considering interference between the UE1 100 and the UE2 200 by D2D communication.

The quality condition of the UE3 300 may be defined by [Equation 1] given below and [Equation 1] reflects a case where the UE1 100, the UE3 300, and the eNB 400 are plural.

$$\gamma_m^C = \frac{p_m g_{bm}}{p_d g_{db} + \sum_{m=1, i \neq m}^{M} p_m g_{bm} + v} \geq \gamma_m^{Creq} \quad [\text{Equation 1}]$$

$$0 < p_m \leq p_m^{max}$$

Herein, $\gamma_m^{Creq}$ represents a minimum required quality (SINR) of an m-th (m is a natural number) UE3 300, $p_m$ represents transmission power of the m-th UE3 300, $g_{bm}$ represents a link gain between the m-th UE3 300 and b-th (b is the natural number) eNB 400, $p_d$ represents a transmission power of d-th (d is the natural number) UE1 100, gab represents a link gain between the d-th UE1 100 and the b-th eNB 400, M represents the number of UE3s 300, $p_m^{max}$ represents maximum transmission power of the m-th UE3 300, and v represents thermal noise.

When the first cellular transmission power value (that is, $p_m$) of the UE3 300 exists and the UE3 300 communicates with the eNB 400 by using the first cellular transmissions power value $p_m$, the UE1 100 may determine whether the second D2D transmission power value (that is, $p_d$) satisfying the quality condition of the UE2 200 exists (S120). For example, the quality condition of the UE2 200 may mean a condition of the minimum signal to interference plus noise ratio (SINR) or more for communication between the UE2 200 and the UE1 100 through the first communication network.

The quality condition of the UE2 200 may be defined by [Equation 2] given below and [Equation 2] reflects a case where the UE1 100, the UE2 200, and the UE3 300 are plural.

$$\gamma_n^D = \frac{p_d g_{dn}}{\sum_{m=1}^{M} p_m g_{mn} + v} \geq \gamma_n^{Dreq} \quad [\text{Equation 2}]$$

$$p_d^{min} \leq p_d \leq p_d^{max}$$

Herein, $\gamma_n^{Dreq}$ represents a minimum required quality (SINR) of an n-th (n is the natural number) UE2 200, $p_d$ represents transmission power of d-th (d is the natural number) UE1 100, $g_{dn}$ represents a link gain between the d-th UE1 100 and n UE2 200, $p_m$ represents transmission power of m-th (m is the natural number) UE3 300, $g_{mn}$ represents a link gain between the m-th UE3 300 and the n-th UE2 200, $P_d^{min}$ represents minimum transmission power of the d-th UE1 100, $P_d^{max}$ represents a maximum transmission power of the d-th UE1 100, M represents the number of UE3s 300, and v represents the thermal noise.

Meanwhile, steps S110 and S120 may be iteratively performed according to an iteration method. The reason is that complexities of [Equation 1] and [Equation 2] are high and it may be determined whether the first cellular transmission power and the second D2D transmission power exist through the iterative execution.

Hereinafter, a process in which steps S110 and S120 are performed according to the iteration method will be described in detail with reference to FIGS. 2 and 3.

First, when the UE1 100 transmits the data to the UE2 200 by using the first D2D transmission power value (for example, $P_d^{min}$), the quality condition of the UE3 300 may be defined by [Equation 3] given below. It is assumed that the number of UE3s 300 is M in [Equation 3]. The UE3 300 may determine whether the first cellular transmission power value exists by using [Equation 3] (S110).

$$\frac{p_1^0 g_{b1}}{P_d^0 g_{db} + \sum_{i=1, i \neq 1}^{M} p_i^0 g_{bi} + v} = \gamma_1^{Creq} \quad [\text{Equation 3}]$$

$$\frac{p_2^0 g_{b2}}{P_d^0 g_{db} + \sum_{i=1, i \neq 2}^{M} p_i^0 g_{bi} + v} = \gamma_2^{Creq}$$

$$\vdots$$

$$\frac{p_M^0 g_{bM}}{P_d^0 g_{db} + \sum_{i=1, i \neq M}^{M} p_i^0 g_{bi} + v} = \gamma_M^{Creq}$$

$$0 < p_m^0 \leq p_m^{max}$$

Herein, $p_d^t$ represents t-th transmission power of the d-th (d is the natural number) UE1 100.

A solution (that is, the first cellular transmission power value of the UE3 300) of [Equation 3] may be defined as $P^0 = (p_1^0, p_2^0, \ldots, p_M^0)$. When the solution of [Equation 3] does not exist, the UE1 100 may stop communication with the UE2 200 (S130).

When the solution of [Equation 3] exists, the UE1 100 may determine whether the second D2D transmission power value satisfying the quality condition of the UE2 200 exists (S120). That is, when the UE3 300 communicates with the eNB 400 by using the first cellular transmission power value, the quality condition of the UE2 200 may be defined by [Equation 4] given below.

$$\frac{P_d^1 g_{d1}}{\sum_{m=1}^{M} p_m^0 g_{m1} + v} \geq \gamma_1^{Dreq} \quad [\text{Equation 4}]$$

$$\frac{P_d^1 g_{d2}}{\sum_{m=1}^{M} p_m^0 g_{m2} + v} \geq \gamma_2^{Dreq}$$

$$\vdots$$

$$\frac{P_d^1 g_{dN}}{\sum_{m=1}^{M} p_m^0 g_{mN} + v} \geq \gamma_N^{Dreq}$$

$$P_d^{min} \leq P_d^1 \leq P_d^{max}$$

When the minimum second D2D transmission power value (that is, $P_d^1$) satisfying [Equation 4] exists, the UE1 100 may update the first D2D transmission power value to the second D2D transmission power value (S140). On the contrary, when the minimum second D2D transmission power value (that is, $P_d^1$) satisfying [Equation 4] does not exist, the UE1 100 may maintain the first D2D transmission power value (S150).

Meanwhile, when the UE1 100 transmits the data to the UE2 200 by using the second D2D transmission power value, the quality condition of the UE3 300 may be defined by [Equation 5] given below. The UE3 300 may determine whether the second cellular transmission power value exists by using [Equation 5] (S160).

$$\frac{p_1^1 g_{b1}}{P_d^1 g_{db} + \sum_{m=1, m \neq 1}^{M} p_m^1 g_{bm} + v} = \gamma_1^{Creq}$$

$$\frac{p_2^1 g_{b2}}{P_d^1 g_{db} + \sum_{m=1, m \neq 2}^{M} p_m^1 g_{bm} + v} = \gamma_2^{Creq}$$

$$\vdots$$

$$\frac{p_M^1 g_{bM}}{P_d^1 g_{db} + \sum_{m=1, m \neq M}^{M} p_m^1 g_{bm} + v} = \gamma_M^{Creq}$$

$$0 < p_m^1 \leq p_m^{max}$$

[Equation 5]

When a solution ($P^1 = (p_1^1, p_2^1, \ldots p_M^1)$) satisfying [Equation 5] exists, the UE1 100 may continuously perform communication with the UE2 200 by using the second D2D transmission power value (S170).

On the contrary, when the solution satisfying [Equation 5] does not exist, the UE1 100 may stop communication with the UE2 200 (S180).

Meanwhile, referring to the description of steps S110 and S120, it may be appreciated that step S160 means a next iteration process of step S110 and it may be appreciated that step S170 means a process in which the UE1 100 communicates with the UE2 200 by using the D2D transmission power value determined to exist after all iterations end.

Referring to FIG. 3, as described above steps S110 to S120 may be iteratively performed according to the iteration method. The iteration process is used to derive an optimal transmission power value of each of the UE1 100 using the first communication network and the UE3 300 using the second communication network.

In FIG. 3, a case where the iteration process of step S110 and S120 is exemplarily performed eight times is illustrated. That is, when the UE1 100 communicates with the UE2 200 by using the first D2D transmission power value (that is, the minimum power value $P_d^{min}$) initially ($0^{th}$ iteration), the UE3 300 may determine whether the first cellular transmission power value satisfying the quality condition exists ($1^{st}$ iteration). When the first cellular transmission power value exists and the UE3 300 communicates with the eNB 400 by using the first cellular transmissions power value, the UE1 100 may determine whether the second D2D transmission power value satisfying the quality condition of the UE2 200 exists ($2^{nd}$ iteration). By such a scheme, $3^{rd}$ iteration to $8^{th}$ iteration are performed and a transmission power value of the UE1 100 and a transmissions power value of the UE3 300 that are collected after the $8^{th}$ iteration may be finally derived to the optimal transmission power value.

As described above, in the power transmission managing method of the heterogeneous network system according to the exemplary embodiment of the present invention, the optimal transmission power value of the UE1 100 through the first communication network and the optimal transmission power value of the UE3 300 through the second communication network may be derived by considering the interference between the first communication network and the second communication network. For example, the optimal transmission power value may be derived by iterating steps S110 and S120. Therefore, according to the transmission power managing method of the heterogeneous network system in the exemplary embodiment of the present invention, the interference between the communication networks may be controlled. Further, according to the exemplary embodiment of the present invention, the transmission power managing method of the heterogeneous network system can manage service qualities of a communication network for the device-to-device communication and a cellular communication network.

Figure 4:
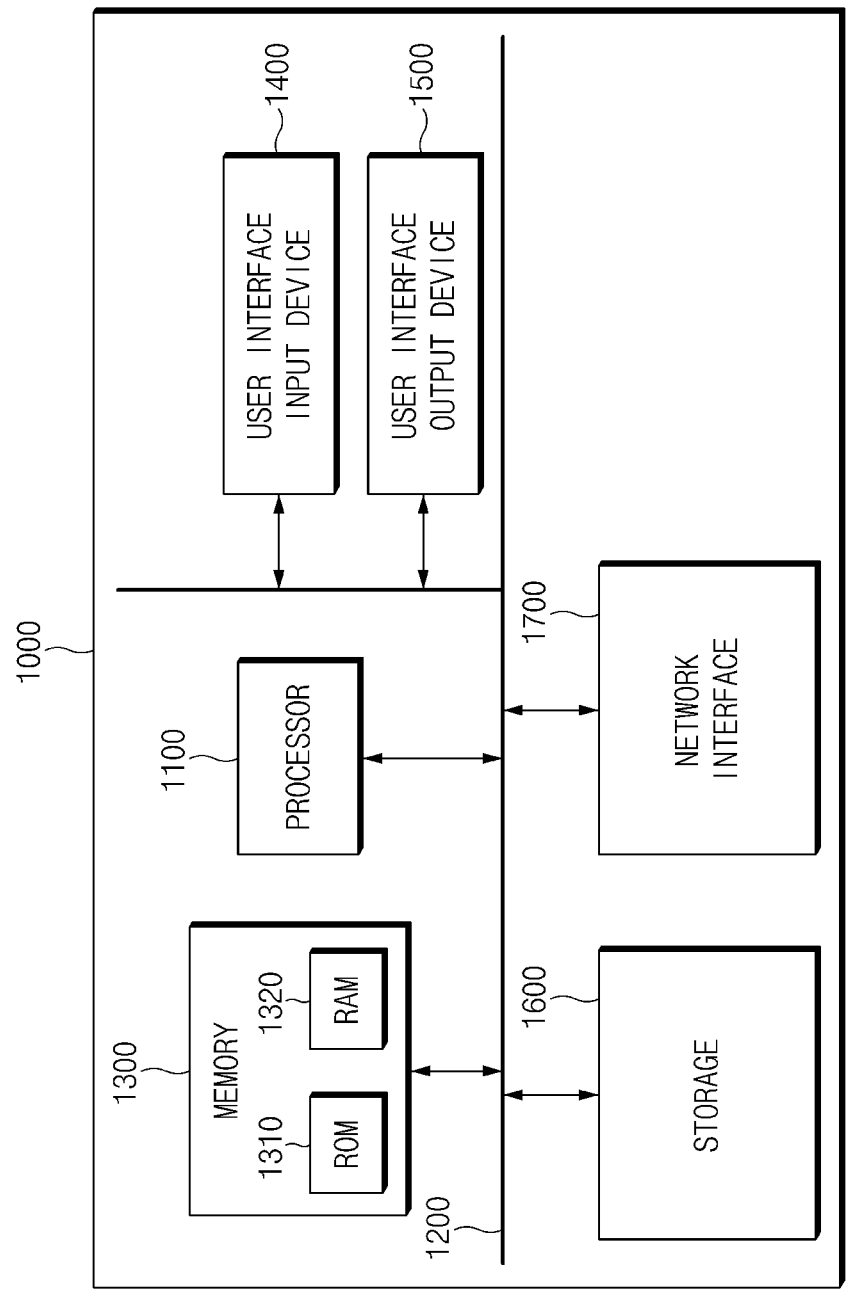
FIG. 4 is a block diagram illustrating a computing system that executes a transmission power managing method of a heterogeneous network system according to an exemplary embodiment of the present invention.

FIG. 4 is a block diagram illustrating a computing system that executes a transmission power managing method of a heterogeneous network system according to an exemplary embodiment of the present invention.

Referring to FIG. 4, the computing system 1000 may include at least one processor 1100, a memory 1300, a user interface input device 1400, a user interface output device 1500, a storage 1600, and a network interface 1700 connected through a bus 1200.

The processor 1100 may be a semiconductor device that executes processing of commands stored in a central processing unit (CPU) or the memory 1300 and/or the storage 1600. The memory 1300 and the storage 1600 may include various types of volatile or non-volatile storage media. For example, the memory 1300 may include a read only memory (ROM) and a random access memory (RAM).

Therefore, steps of a method or an algorithm described in association with the exemplary embodiments disclosed in the specification may be directly implemented by hardware and software modules executed by the processor 1100, or a combination thereof. The software module may reside in storage media (that is, the memory 1300 and/or the storage 1600) such as a RAM memory, a flash memory, a ROM memory, an EPROM memory, an EEPROM memory, a register, a hard disk, a removable disk, and a CD-ROM.

The exemplary storage medium is coupled to the processor 1100 and the processor 1100 may read information from the storage medium and write the information in the storage medium. As another method, the storage medium may be integrated with the processor 1100. The processor and the storage medium may reside in an application specific integrated circuit (ASIC). The ASIC may reside in a user terminal. As yet another method, the processor and the storage medium may reside in the user terminal as individual components.

The above description is for illustrative purpose only and various modifications and transformations become apparent to those skilled in the art within a scope without departing from an essential characteristic of the present invention.

Therefore, the exemplary embodiments disclosed in the present invention are used to not limit but describe the technical spirit of the present invention and the scope of the technical spirit of the present invention is not limited by the exemplary embodiments. The scope of the present invention should be interpreted by the appended claims and it should be analyzed that the technical spirit in the equivalent range is intended to be embraced by the present invention.

What is claimed is:

1. A transmission power managing method of a heterogeneous network system, the method comprising:
  determining, when a first terminal communicates with a second terminal by using a first Device-to-Device (D2D) transmission power value through a first communication network, whether a first cellular transmission power value of a third terminal satisfying a quality condition of the third terminal which communicates with a base station through a second communication network exists;

determining, when the first cellular transmission power value exists and the third terminal communicates with the base station by using the first cellular transmission power value, whether a second D2D transmission power value of the first terminal satisfying a quality condition of the second terminal exists;

updating, by the first terminal, the first D2D transmission power value to the second D2D transmission power value when the second D2D transmission power value exists;

determining whether a second cellular transmission power value of the third terminal, which satisfies a quality condition of the third terminal exists when the first terminal communicates with the second terminal by using the second D2D transmission power value; and communicating, by the first terminal, with the second terminal by using the second D2D transmission power value when the second cellular transmission power value exists.

2. The transmission power managing method of claim 1, wherein the determining, when the first terminal communicates with the second terminal by using the first D2D transmission power value through the first communication network, whether the first cellular transmission power value of the third terminal satisfying the quality condition of the third terminal which communicates with the base station through the second communication network exists and the determining, when the first cellular transmission power value exists and the third terminal communicates with the base station by using the first cellular transmission power value, whether the second D2D transmission power value of the first terminal satisfying the quality condition of the second terminal exists are iteratively performed.

3. The transmission power managing method of claim 1, wherein the first communication network is a communication network for D2D communication and the second communication network is a cellular communication network.

4. The transmission power managing method of claim 1, wherein the first terminal transmits advertisement information to the second terminal.

5. The transmission power managing method of claim 1, further comprising:

stopping communication between the first terminal and the second terminal when the first cellular transmission power value of the third terminal satisfying the quality condition of the third terminal does not exist.

6. The transmission power managing method of claim 1, wherein in the determining, when the first terminal communicates with the second terminal by using the first D2D transmission power value through the first communication network, whether the first cellular transmission power value of the third terminal satisfying the quality condition of the third terminal which communicates with the base station through the second communication network exists, the first terminal communicates with the second terminal by using a minimum power value.

7. The transmission power managing method of claim 1, A transmission power managing method of a heterogeneous network system, the method comprising:

determining, when a first terminal communicates with a second terminal by using a first Device-to-Device (D2D) transmission power value through a first communication network, whether a first cellular transmission power value of a third terminal satisfying a Quality condition of the third terminal which communicates with a base station through a second communication network exists:

determining, when the first cellular transmission power value exists and the third terminal communicates with the base station by using the first cellular transmission power value, whether a second D2D transmission power value of the first terminal satisfying a Quality condition of the second terminal exists; and updating, by the first terminal, the first D2D transmission power value to the second D2D transmission power value when the second D2D transmission power value exists, wherein the quality condition of the third terminal is defined by [Equation 1] given below $$\gamma_m C = p_m \square g_{bm} p_d \square g_{db} + \Sigma m = 1, i \neq m M \square p_m \square g_{bm} + v \geq \gamma_m Creq \square \square 0 < p_m \leq p_m \max \quad \text{[Equation 1]}$$

(Herein, $\gamma_m^{Creq}$ represents a minimum required quality (SINR) of an m-th (m is a natural number) third terminal, $p_m$ represents transmission power of the m-th third terminal, $g_{bm}$ represents a link gain between the m-th third terminal and a b-th (b is the natural number) base station, $p_d$ represents a transmission power of a d-th (d is the natural number) first terminal, $g_{db}$ represents a link gain between the d-th first terminal and the b-th base station, M represents the number of third terminals, $P_m^{max}$ represents maximum transmission power of the m-th third terminal, and v represents thermal noise).

8. The transmission power managing method of claim 1, A transmission power managing method of a heterogeneous network system, the method comprising:

determining, when a first terminal communicates with a second terminal by using a first Device-to-Device (D2D) transmission power value through a first communication network, whether a first cellular transmission power value of a third terminal satisfying a Quality condition of the third terminal which communicates with a base station through a second communication network exists;

determining, when the first cellular transmission power value exists and the third terminal communicates with the base station by using the first cellular transmission power value, whether a second D2D transmission power value of the first terminal satisfying a quality condition of the second terminal exists: and updating, by the first terminal, the first D2D transmission power value to the second D2D transmission power value when the second D2D transmission power value exists, wherein the quality condition of the second terminal is defined by [Equation 2] given below $$\gamma_n D = p_d \square g_{dn} \Sigma m = 1 M \square p_m \square g_{mn} + v \geq \gamma_n Dreq \square \square p_d \min \leq p_d \leq p_d \max \quad \text{[Equation 2]}$$

(Herein, $\gamma_n^{Dreq}$ represents a minimum required quality (SINR) of an n-th (n is the natural number) second terminal, $p_d$ represents transmission power of a d-th (d is the natural number) first terminal, $g_{dn}$ represents a link gain between the d-th first terminal and an n-th (n is the natural number) second terminal, $p_m$ represents transmission power of an m-th (m is the natural number) third terminal, $g_{mn}$ represents a link gain between the m-th third terminal and the n-th second terminal, $P_d^{min}$ represents minimum transmission power of the d-th first terminal, $P_d^{max}$ represents maximum transmission power of the d-th first terminal, M represents the number of third terminals, and v represents the thermal noise).

9. The transmission power managing method of claim 1, further comprising:

stopping, by the first terminal, communication with the second terminal when a second cellular transmission power value of the third terminal satisfying the quality condition of the third terminal does not exist.

\* \* \* \* \*